United States Patent
Meylan et al.

(10) Patent No.: US 10,531,354 B2
(45) Date of Patent: Jan. 7, 2020

(54) LTE'S WLAN MOBILITY SET PRIORITIZATION

(71) Applicant: QUALCOMM Incorporated, San Diego, CA (US)

(72) Inventors: Arnaud Meylan, San Diego, CA (US); Ozcan Ozturk, San Diego, CA (US); Sivaramakrishna Veerepalli, San Diego, CA (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/490,744

(22) Filed: Apr. 18, 2017

(65) Prior Publication Data

US 2017/0339619 A1 Nov. 23, 2017

Related U.S. Application Data

(60) Provisional application No. 62/347,431, filed on Jun. 8, 2016, provisional application No. 62/338,335, filed on May 18, 2016.

(51) Int. Cl.
*H04L 12/28* (2006.01)
*H04W 36/32* (2009.01)
(Continued)

(52) U.S. Cl.
CPC .......... *H04W 36/32* (2013.01); *H04W 16/14* (2013.01); *H04W 24/10* (2013.01); *H04W 36/14* (2013.01);
(Continued)

(58) Field of Classification Search
CPC ....................................................... H04L 12/50
(Continued)

(56) References Cited

U.S. PATENT DOCUMENTS

2015/0222410 A1 8/2015 Belghoul et al.
2016/0119846 A1 4/2016 Chou et al.
(Continued)

FOREIGN PATENT DOCUMENTS

WO WO-2016003222 A1 1/2016

OTHER PUBLICATIONS

""3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3rd Generation Partnership Project; 3GPP Standard; 3GPP TS 36.300., 3rd Generation Partnership Project (3GPP),Mobile Competence Centre ; 650, Route Deslucioles ; F-06921 Sophia-Antipolis Cedex; France, vol. RAN WG2, No. V13.3.0, Apr. 1, 2016 (2916-04-91), pp. 1-295, XP051088532, [retrieved on Apr. 1, 2016] p. 231-p. 259."
(Continued)

*Primary Examiner* — Dang T Ton
(74) *Attorney, Agent, or Firm* — Norton Rose Fulbright LLP

(57) ABSTRACT

Methods and corresponding apparatuses for LTE's WLAN mobility set prioritization are discussed. The method includes detecting an integrated WLAN and a legacy WLAN, measuring the connection quality of the integrated WLAN and/or the connection quality of the legacy WLAN, and determining whether to select the legacy WLAN over the integrated WLAN based on the measurement results. The method further includes detecting a WWAN using both licensed and unlicensed spectrum, and refraining from connecting to the legacy WLAN in response to the detecting.

31 Claims, 12 Drawing Sheets

(51) Int. Cl.
*H04W 76/27* (2018.01)
*H04W 16/14* (2009.01)
*H04W 24/10* (2009.01)
*H04W 36/14* (2009.01)
*H04W 36/30* (2009.01)
*H04W 84/04* (2009.01)
*H04W 84/12* (2009.01)

(52) U.S. Cl.
CPC ............ *H04W 36/30* (2013.01); *H04W 76/27* (2018.02); *H04W 84/042* (2013.01); *H04W 84/12* (2013.01)

(58) Field of Classification Search
USPC .......................................................... 370/329
See application file for complete search history.

(56) References Cited

U.S. PATENT DOCUMENTS

2017/0142759 A1    5/2017  Jung et al.
2018/0092000 A1*   3/2018  Kim ..................... H04W 28/08

OTHER PUBLICATIONS

Catt., et al., "UE behavior in RRC IDLE mode", 3GPP Draft; R2-161093 UE Behaviour in RRC Idle Mode, 3rd Generation Partnership Project (3GPP), Mobile Competence Centre ; 650, Route Des Lucioles ; F-06921 Sophia-Antipolis Cedex ; France, vol. RAN WG2, No. St. Julian; Feb. 15, 2016-Feb. 19, 2016, Feb. 14, 2016 (Feb. 14, 2016), XP951e55983, Retrieved from the Internet: URL: http://www.3gpp.org/ftp/Meetings_3GPP_SYNC/RAN2/Docs/ [retrieved on Feb. 14, 2016] the whole document.
"Co-existence of LWA/LWIP with legacy operator WLAN" 11, 3GPP Draft; R2-162605 LWA LWIP Coexistence, 3rd Generation Partnership Project (3GPP), Generation Partnership Project (3GPP), Mobile Competence Centre ; 650, Route Des Lucioles ; F-06921 Sophia-Antipolis Cedex; France, vol. RAN WG2, No. Dubrovnik, Croatia; Apr. 12, 2016-Apr. 16, 2016 (Apr. 2, 2016), XP051082635, Retrieved from the Internet: URL: http://www.3gpp.org/ftp/tsg ran/WG2 RL2/TSGR2 93bis/Docs/—[retrieved on Apr. 2, 2016].
"Etri., et al., "Analysis on requirement fulfillment of network selection solutions", 3GPP Draft; R2-132485 Analysis on Requirement Fulfilment of Network Selection Solutions; 3rd Generation Partnership Project (3GPP), Mobile Competence Centre ; 650, Route Des Lucioles ; F-06921 Sophia—, Aug. 9, 2013 (Aug. 9, 2013), XP050718189, Retrieved from the Internet: URL: http://www.3gpp.org/ftp/tsg_ran/WG2_RL2/TSGR2_83/Docs/ [retrieved on Aug. 9, 2013] figure 1."
International Search Report and Written Opinion—PCT/US2017/028265—ISA/EPO—dated Sep. 29, 2017.
Kyocera: "RAN assistance parameters for IDLE UE in Interworking Ehancement," 3GPP Draft; R2-154694 Coexistence with Rel-12, 3rd Generation Partnership Project (3GPP), Mobile Competence Centre; 650, Route Des Lucioles; F-06921, Sophia-Antipolis Cedex; France, vol. RAN WG2, No. Malmo, Sweden; Oct. 5, 2015-Oct. 9, 2015, Oct. 4, 2015 (Oct. 4, 2015), XP051005198, pp. 1-3, Retrieved from the Internet: URL:http://www.3gpp.org/ftp/Meetings_3GPP_SYNC/RAN2/Docs/.
Partial International Search Report—PCTIUS2017/028265—ISA/EPO—dated Jul. 20, 2017.

* cited by examiner

LTE'S WLAN MOBILITY SET PRIORITIZATION

CROSS-REFERENCE TO RELATED APPLICATIONS

This application claims the benefit of U.S. Provisional Patent Application No. 62/338,335, entitled, "LTE'S WLAN MOBILITY SET PRIORITIZATION," filed on May 18, 2016, and U.S. Provisional Patent Application No. 62/347,431, entitled, "LTE'S WLAN MOBILITY SET PRIORITIZATION," filed on Jun. 8, 2016, which is expressly incorporated by reference herein in its entirety.

BACKGROUND

Field

Aspects of the present disclosure relate generally to wireless communication systems, and more particularly, to long term evolution's (LTE's) wireless local area network (WLAN) mobility set prioritization.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

In recent 3GPP Release documents, internetworking and integration of LTE and wireless local access network (WLAN) are proposed to better utilize radio resources provided by two radio access networks. Delivery of cellular traffic over WLAN would reduce congestion of cellular network by taking advantage of: (1) most of mobile devices usually have a built-in WLAN function, and (2) WLAN networks are readily available. In 3GPP Release 12, radio access network (RAT) assisted interworking is proposed to provide a mobile device with parameters and rules to help the mobile device to make a decision to steer data traffic to either a WLAN or LTE. In 3GPP Release 13, RAN controlled interworking is proposed to allow network operators to control when and where to steer data traffic through a steering command.

SUMMARY

In one aspect of the disclosure, a method of wireless communication includes configuring, at a user equipment (UE), an idle mobility set, detecting, at the UE, an integrated wireless local access network (WLAN) and a legacy WLAN, wherein the integrated WLAN supports an integration of WLAN and wireless wide access network (WWAN), wherein the detecting the integrated WLAN includes determining the integrated WLAN is present based on the configured idle mobility set, refraining from connecting to the integrated WLAN and the legacy WLAN via one or more WLAN access points (APs) in response to the detecting, and receiving a dedicated mobility set from a base station of the WWAN.

In one aspect of the disclosure, a method of wireless communication includes performing, by a UE, a WLAN measurement, obtaining from at least one base station, an identifier of a WLAN that supports an integration of WLAN and WWAN based on the WLAN measurement, and storing the identifier of the WLAN and an identifier of the at least one base station in a database.

In one aspect of the disclosure, a method of wireless communication includes connecting to a legacy WLAN, wherein the legacy WLAN does not support an integration of WLAN and WWAN, connecting to a base station to check whether the base station configures a mobility set after the connecting to the legacy WLAN, and receiving the mobility set during the connection with the base station.

In one aspect of the disclosure, a method of wireless communication includes detecting, at a UE, an integrated WLAN and a legacy WLAN, wherein the integrated WLAN supports an integration of WLAN and WWAN, wherein the detecting the integrated WLAN includes receiving a broadcast message including configuration information of mobility set and determining the integrated WLAN is present based on the broadcast message, wherein the configuration information includes one or more identifiers of WLANs that support the integration of WLAN and WWAN, and refraining from connecting to the integrated WLAN and the legacy WLAN via one or more WLAN APs in response to the detecting.

In one aspect of the disclosure, a method of wireless communication includes transmitting an indication to a UE to indicate a capability of configuring a dedicated mobility set for an integration of WLAN and WWAN, wherein the indication includes one or more of: a flag in a system information block (SIB), configuration information of mobility set, or information element of mobility set, and transmitting the dedicated mobility set to the UE.

In an additional aspect of the disclosure, an apparatus configured for wireless communication includes means for configuring, at a UE, an idle mobility set, means for detecting, at the UE, an integrated WLAN and a legacy WLAN, wherein the integrated WLAN supports an integration of WLAN and WWAN, wherein the means for detecting the integrated WLAN includes means for determining the integrated WLAN is present based on the configured idle mobility set, means for refraining from connecting to the integrated WLAN and the legacy WLAN via one or more WLAN APs in response to the detecting, and means for receiving a dedicated mobility set from a base station of the WWAN.

In an additional aspect of the disclosure, an apparatus configured for wireless communication includes means for performing, by a UE, a WLAN measurement, means for obtaining from at least one base station, an identifier of a WLAN that supports an integration of WLAN and WWAN based on the WLAN measurement, and means for storing the identifier of the WLAN and an identifier of the at least one base station in a database.

In an additional aspect of the disclosure, an apparatus configured for wireless communication includes means for connecting to a legacy WLAN, wherein the legacy WLAN does not support an integration of WLAN and WWAN, means for connecting to a base station to check whether the base station configures a mobility set after the connecting to the legacy WLAN, and means for receiving the mobility set during the connection with the base station.

In an additional aspect of the disclosure, an apparatus configured for wireless communication includes means for detecting, at a UE, an integrated WLAN and a legacy WLAN, wherein the integrated WLAN supports an integration of WLAN and WWAN, wherein the means for detecting the integrated WLAN includes means for receiving a broadcast message including configuration information of mobility set and means for determining the integrated WLAN is present based on the broadcast message, wherein the configuration information includes one or more identifiers of WLANs that support the integration of WLAN and WWAN, and means for refraining from connecting to the integrated WLAN and the legacy WLAN via one or more WLAN APs in response to the detecting.

In an additional aspect of the disclosure, an apparatus configured for wireless communication includes means for transmitting an indication to a UE to indicate a capability of configuring a dedicated mobility set for an integration of WLAN and WWAN, wherein the indication includes one or more of: a flag in a SIB, configuration information of mobility set, or information element of mobility set, and means for transmitting the dedicated mobility set to the UE.

In some aspects of the disclosure, a non-transitory computer-readable medium having program code recorded thereon. The program code further includes program code for causing a computer to configure, at a UE, an idle mobility set, program code for causing the computer to detect, at the UE, an integrated WLAN and a legacy WLAN, wherein the integrated WLAN supports an integration of WLAN and WWAN, wherein the program code for causing the computer to detect the integrated WLAN includes program code for causing the computer to determine the integrated WLAN is present based on the configured idle mobility set, program code for causing the computer to refrain from connecting to the integrated WLAN and the legacy WLAN via one or more WLAN APs in response to the detecting, and program code for causing the computer to receive a dedicated mobility set from a base station of the WWAN.

In some aspects of the disclosure, a non-transitory computer-readable medium having program code recorded thereon. The program code further includes program code for causing a computer to perform, by a UE, a WLAN measurement, program code for causing the computer to obtain from at least one base station, an identifier of a WLAN that supports an integration of WLAN and WWAN based on the WLAN measurement, and program code for causing a computer to store the identifier of the WLAN and an identifier of the at least one base station in a database.

In some aspects of the disclosure, a non-transitory computer-readable medium having program code recorded thereon. The program code further includes program code for causing a computer to connect to a legacy WLAN, wherein the legacy WLAN does not support an integration of WLAN and WWAN, program code for causing the computer to connect to a base station to check whether the base station configures a mobility set after the connecting to the legacy WLAN, and program code for causing the computer to receive the mobility set during the connection with the base station.

In some aspects of the disclosure, a non-transitory computer-readable medium having program code recorded thereon. The program code further includes program code for causing a computer to detect, at a UE, an integrated WLAN and a legacy WLAN, wherein the integrated WLAN supports an integration of WLAN and WWAN, wherein the program code for causing the computer to detect the integrated WLAN includes program code for causing the computer to receive a broadcast message including configuration information of mobility set and program code for causing the computer to determine the integrated WLAN is present based on the broadcast message, wherein the configuration information includes one or more identifiers of WLANs that support the integration of WLAN and WWAN, and program code for causing the computer to refrain from connecting to the integrated WLAN and the legacy WLAN via one or more WLAN APs in response to the detecting.

In some aspects of the disclosure, a non-transitory computer-readable medium having program code recorded thereon. The program code further includes program code for causing the computer to transmit an indication to a UE to indicate a capability of configuring a dedicated mobility set for an integration of WLAN and WWAN, wherein the indication includes one or more of: a flag in a SIB, configuration information of mobility set, or information element of mobility set, and program code for causing the computer to transmit the dedicated mobility set to the UE.

In an additional aspect of the disclosure, an apparatus configured for wireless communication is disclosed. The apparatus includes at least one processor, and a memory coupled to the processor. The processor is configured to configure, at a UE, an idle mobility set, to detect, at the UE, an integrated WLAN and a legacy WLAN, wherein the integrated WLAN supports an integration of WLAN and WWAN, wherein the configuration of the at least one processor to detect the integrated WLAN includes configuration to determine the integrated WLAN is present based on the configured idle mobility set, to refrain from connecting to the integrated WLAN and the legacy WLAN via one or more WLAN APs in response to the detecting, and to receive a dedicated mobility set from a base station of the WWAN.

In an additional aspect of the disclosure, an apparatus configured for wireless communication is disclosed. The apparatus includes at least one processor, and a memory coupled to the processor. The processor is configured to perform, by a UE, a WLAN measurement, to obtain from at least one base station, an identifier of a WLAN that supports an integration of WLAN and WWAN based on the WLAN measurement, and to store the identifier of the WLAN and an identifier of the at least one base station in a database.

In an additional aspect of the disclosure, an apparatus configured for wireless communication is disclosed. The apparatus includes at least one processor, and a memory coupled to the processor. The processor is configured to connect to a legacy WLAN, wherein the legacy WLAN does not support an integration of WLAN and WWAN, to connect to a base station to check whether the base station configures a mobility set after the connecting to the legacy WLAN, and to receive the mobility set during the connection with the base station.

In an additional aspect of the disclosure, an apparatus configured for wireless communication is disclosed. The apparatus includes at least one processor, and a memory coupled to the processor. The processor is configured to detect, at a UE, an integrated WLAN and a legacy WLAN, wherein the integrated WLAN supports an integration of WLAN and WWAN, wherein the configuration of the at least one processor to detect the integrated WLAN includes configuration to receive a broadcast message including configuration information of mobility set and configuration to determine the integrated WLAN is present based on the broadcast message, wherein the configuration information includes one or more identifiers of WLANs that support the integration of WLAN and WWAN, and to refrain from connecting to the integrated WLAN and the legacy WLAN via one or more WLAN APs in response to the detecting.

In an additional aspect of the disclosure, an apparatus configured for wireless communication is disclosed. The apparatus includes at least one processor, and a memory coupled to the processor. The processor is configured to transmit an indication to a UE to indicate a capability of configuring a dedicated mobility set for an integration of WLAN and WWAN, wherein the indication includes one or more of: a flag in a system information block (SIB), configuration information of mobility set, or information element of mobility set, and to transmit the dedicated mobility set to the UE.

In one aspect of the disclosure, a method of wireless communication includes detecting, at a UE, an integrated WLAN, wherein the integrated WLAN supports an integration of WLAN and WWAN, detecting, at the UE, a legacy WLAN, measuring one or more of: connection quality of the integrated WLAN or connection quality of the WWAN, and determining whether to select the legacy WLAN over the integrated WLAN based on one or more of: the measured connection quality of the integrated WLAN, or the measured connection quality of the WWAN.

In one aspect of the disclosure, a method of wireless communication includes detecting, at a UE, a WWAN using licensed and unlicensed spectrum and a legacy WLAN, and refraining from connecting to the legacy WLAN in response to the detecting.

In another aspect of the disclosure, an apparatus configured for wireless communication includes means for detecting, at a UE, an integrated WLAN, wherein the integrated WLAN supports an integration of WLAN and WWAN, means for detecting, at the UE, a legacy WLAN, means for measuring one or more of: connection quality of the integrated WLAN or connection quality of the WWAN, and means for determining whether to select the legacy WLAN over the integrated WLAN based on one or more of: the measured connection quality of the integrated WLAN, or the measured connection quality of the WWAN.

In another aspect of the disclosure, an apparatus configured for wireless communication includes means for detecting, at a UE, a WWAN using licensed and unlicensed spectrum and a legacy WLAN, and means for refraining from connecting to the legacy WLAN in response to the detecting.

In some aspects of the disclosure, a non-transitory computer-readable medium having program code recorded thereon. The program code includes program code for causing a computer to detect, at a UE, an integrated WLAN, wherein the integrated WLAN supports an integration of WLAN and WWAN, program code for causing the computer to detect, at the UE, a legacy WLAN, program code for causing the computer to measure one or more of: connection quality of the integrated WLAN or connection quality of the WWAN, and program code for causing the computer to determine whether to select the legacy WLAN over the integrated WLAN based on one or more of: the measured connection quality of the integrated WLAN, or the measured connection quality of the WWAN.

In some aspects of the disclosure, a non-transitory computer-readable medium having program code recorded thereon. The program code includes program code for causing a computer to detect, at a UE, a WWAN using licensed and unlicensed spectrum and a legacy WLAN, and program code for causing the computer to refrain from connecting to the legacy WLAN in response to the detecting.

In an additional aspect of the disclosure, an apparatus configured for wireless communication is disclosed. The apparatus includes at least one processor, and a memory coupled to the at least one processor. The at least one processor is configured to detect, at a UE, an integrated WLAN, wherein the integrated WLAN supports an integration of WLAN and WWAN, to detect, at the UE, a legacy WLAN, to measure one or more of: connection quality of the integrated WLAN or connection quality of the WWAN, and to determine whether to select the legacy WLAN over the integrated WLAN based on one or more of: the measured connection quality of the integrated WLAN, or the measured connection quality of the WWAN.

In an additional aspect of the disclosure, an apparatus configured for wireless communication is disclosed. The apparatus includes at least one processor, and a memory coupled to the at least one processor. The at least one processor is configured to detect, at a UE, a WWAN using licensed and unlicensed spectrum and a legacy WLAN, and to refrain from connecting to the legacy WLAN in response to the detecting.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
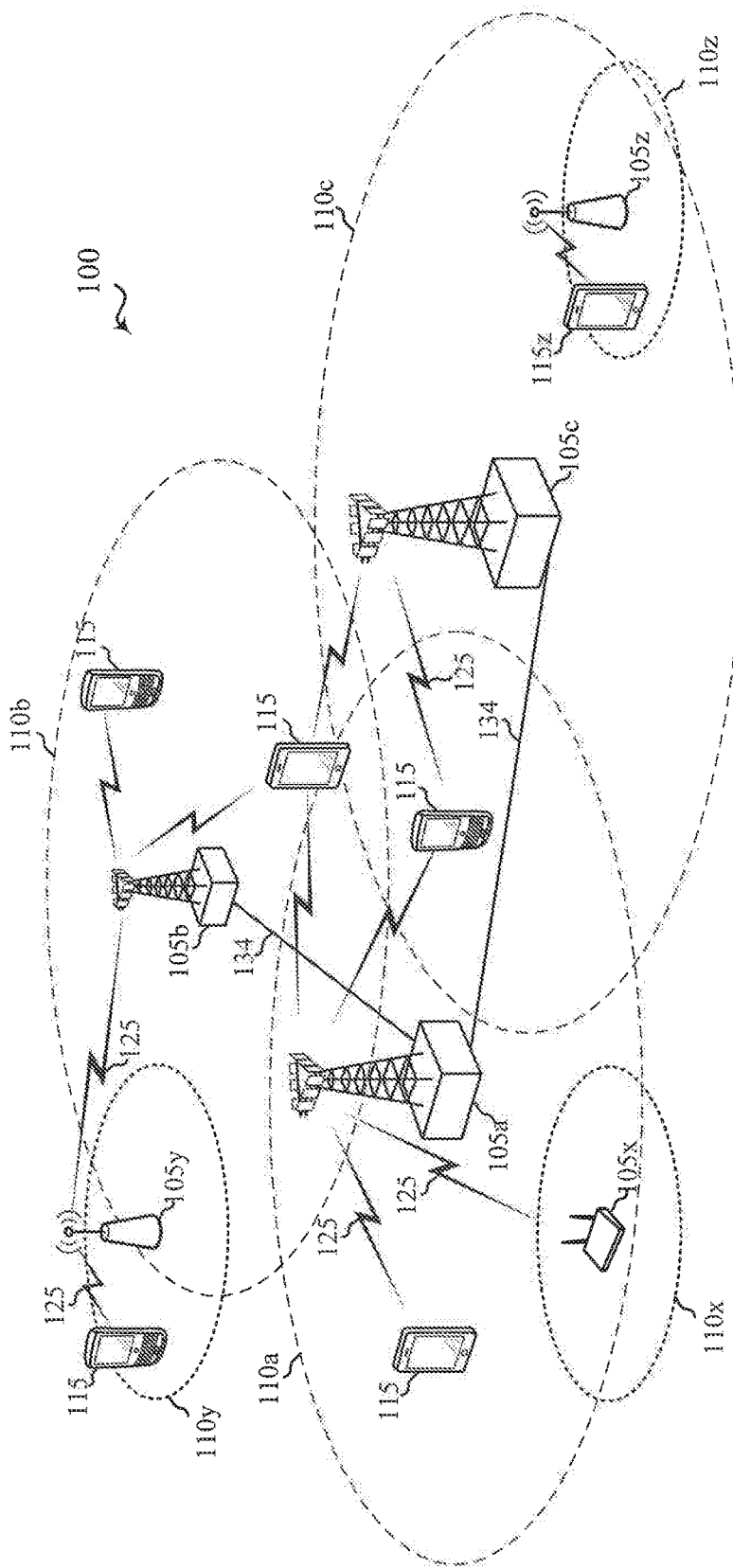
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
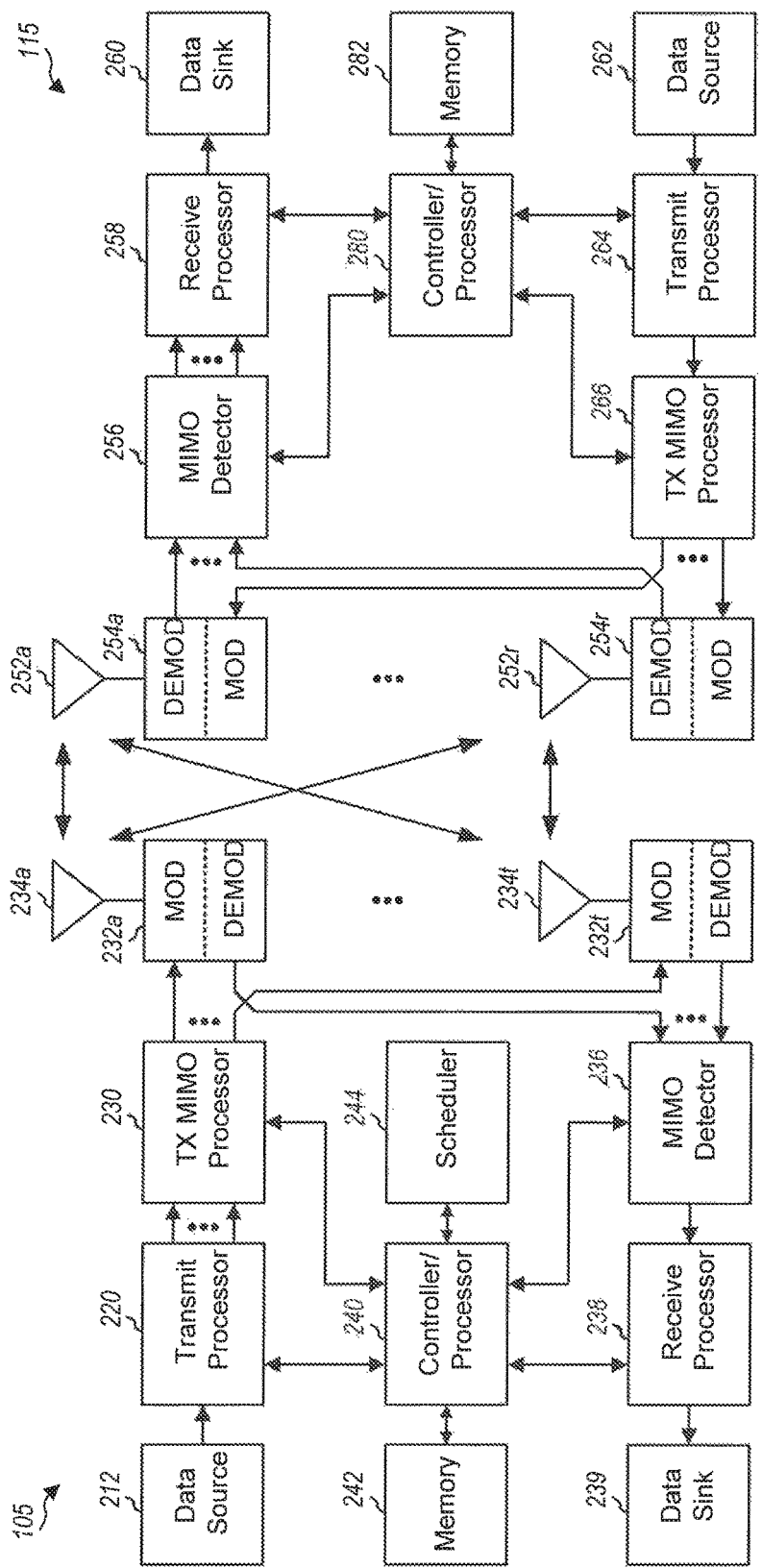
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 4-8, and/or other processes for the techniques described herein. The memories 242 and 282 may store data and program codes for the eNB 105 and the UE 115, respectively. A scheduler 244 may schedule UEs for data transmission on the downlink and/or uplink.

Interworking between heterogeneous RATs has undergone remarkable growth as there is explosive growth in UEs, such as smart phone devices, tablets, etc. One industry trend is to facilitate greater cooperation between wireless local area networks (WLANs) and wireless wide area networks (WWANs). A WLAN may refer to a wireless communication network that links two or more devices in relatively short ranges, e.g., a femto cell and/or a pico cell. A WLAN may be within a limited area, such as a home or office building, and provide a relatively small network coverage. One example of RAT used by the WLAN may be Wi-Fi (i.e., using IEEE 802.11 standards). A WLAN may use unlicensed radio spectrum that includes radio frequencies allowed by a government authority. A WWAN may refer to a wireless communication network that provides relatively large network coverage, e.g., a macro cell. Examples of RAT used by the WWAN may include 3GPP LTE network, 5G network, 3G network, GSM network, etc. The WLAN and WWAN may be integrated in a RAT level to allow for contemporaneous use of radio resources between the two RATs. As used herein, an integrated WLAN may refer to a WLAN that supports an integrated WLAN-WWAN RAT architecture. In contrast to the integrated WLAN, a legacy WLAN may refer to a WLAN that does not support such integrated WLAN-WWAN RAT architecture.

3GPP Release 13 introduces three features related to WLAN-WWAN integration and interworking: LTE WLAN Aggregation (LWA), LTE WLAN Integration at IP Tunnel (LWIP), and RAN Controlled LTE WLAN Integration (RCLWI). LWA may enable aggregation of LTE and WLAN at Packet Data Convergence Protocol (PDCP) layer. While it is possible to aggregate the LTE and WLAN at higher layers, performing aggregation at the RAN level, such as the PDCP layer, may give more control to operators. LWIP may enable the PDCP aggregation to be supported by legacy WLAN access points (APs) together with non-collocated LTE eNBs using IPSec tunneling between them. The eNB may control activation of the integration based on UE connectivity with a WLAN. RCLWI may enable a network operator to manage WLAN connectivity in both connected and idle modes, and offload data traffic from a WWAN to a WLAN via Evolved Packet Data Gateway (ePDG). These three features may rely on a mobility set, WLAN management, and WLAN status reporting. Their difference may appear at the access point name (APN) or bearer level. A given bear may be in LWA or LWIP mode.

The mobility set is a set of WLAN networks identified by service set identifiers (SSIDs), basic service set identifiers (BSSIDs), or homogenous extended service set identifiers (HESSIDs). The mobility set may be configured by an eNB and be transmitted to a UE that is RRC-connected with the eNB using dedicated signals. Therefore, such mobility set may also be called as a dedicated mobility set. In response, the UE may be allowed to connect to the identified WLAN networks without informing the eNB. The mobility set may enable the three features introduced by 3GPP Release 13 as discussed above. In contrast, a set of identifiers of WLANs, by either locally configured or broadcast, does not meet a dedicated mobility set. As used herein, such set of identifiers of WLANs may be called as an idle mobility set.

Figure 3:
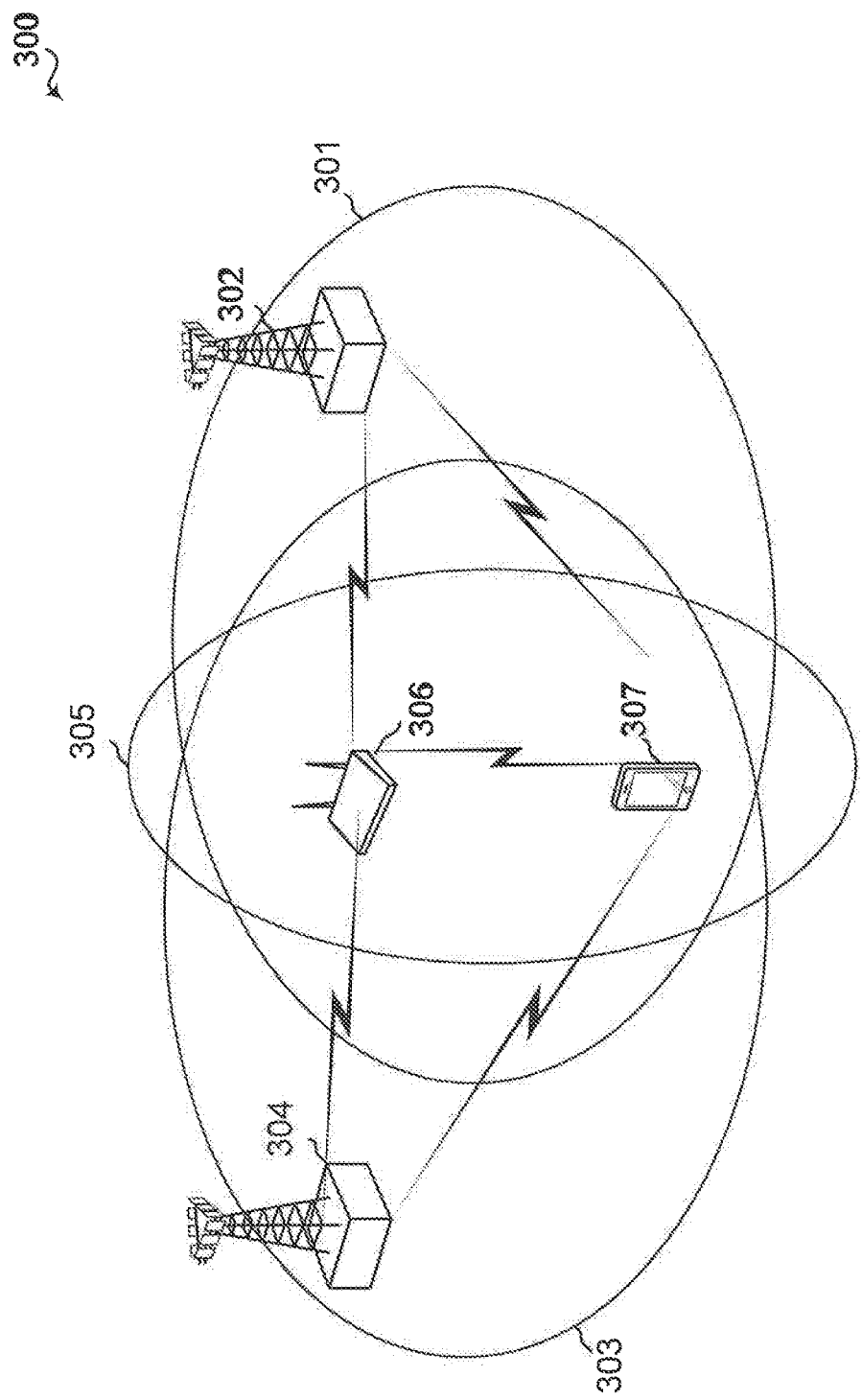
FIG. 3 is a block diagram illustrating details of a wireless communication system according to one aspect of the present disclosure.

FIG. 3 shows a wireless network 300 for communication, which may include WLAN and WWAN coverages according to one aspect of the present disclosure. eNB 302 may be associated with LTE network and provide services in LTE network coverage 301. LTE network may be integrated with a WLAN. eNB 302 may be capable of configuring a mobility set and enable the features in 3GPP Release 13 accordingly. Base station 304 may be associated with a legacy network and provide services in legacy network coverage 303. The legacy network may include GSM network, or other networks that are incapable of configuring a mobility set. WLAN AP 306 may provide Wi-Fi connectivity in region 305. LTE network coverage 301 and GSM network coverage 303 may overlap in region 305. WLAN AP 306 may connect to both the LTE and GSM networks. Accordingly, WLAN AP 306 may provide an integrated WLAN connection and a legacy WLAN connection to UE 307 that is located in region 305. In the scenarios illustrated in FIG. 3, the integrated WLAN connection may refer to connection provided by an integrated LTE-WLAN RAT. The legacy WLAN connection may refer to connection provided by a WLAN that does not support any integration or interworking between the WLAN and any other networks, such as the legacy network. The legacy WLAN may be configured via an Access Network Discovery and Selection Function (ANDSF) RanMobilitySetUsed node.

In some aspects of the present disclosure, the integrated WLAN connection and the legacy WLAN connection may be provided by different WLAN APs to UE 307 in region 305 (not shown in FIG. 3). In some aspects of the present disclosure, WLAN AP 306 and eNB 302 may be collocated (not shown in FIG. 3).

When UE 307 enters into region 305, UE 307 may automatically choose a legacy WLAN connection over an integrated WLAN connection as the legacy WLAN connection is handled by high level operating system (HLOS). As a result, UE 307 may be prevented from switching to a radio resource control (RRC)-connected mode and obtaining a mobility set from LTE network. Then, the features in 3GPP Release 13 may not be enabled due to prioritization of a legacy WLAN over an integrated WLAN by UE 307. Hence, there is a need to develop procedures to facilitate acquiring a mobility set from an eNB by a UE by performing prioritization among legacy WLANs, integrated WLANs, and WWANs, such as LTE network. The procedures in accordance with the present disclosure are described as follows.

As discussed above, a UE may choose a legacy WLAN connection over an integrated WLAN connection when the legacy WLAN and the integrated WLAN are available at the same time. As a result, the UE may not be able to acquire a dedicate mobility set from an eNB associated with LTE network. In order to mitigate this issue, the UE may refrain from connecting to any WLAN, and rely on local configuration information until receiving a dedicated mobility set from an eNB associated with LTE network. The local configuration information may include a configuration file that is locally stored in a UE, a configuration policy transmitted to the UE over-the-air, or a configuration policy transmitted to the UE with other network policies or configurations.

Figure 4:
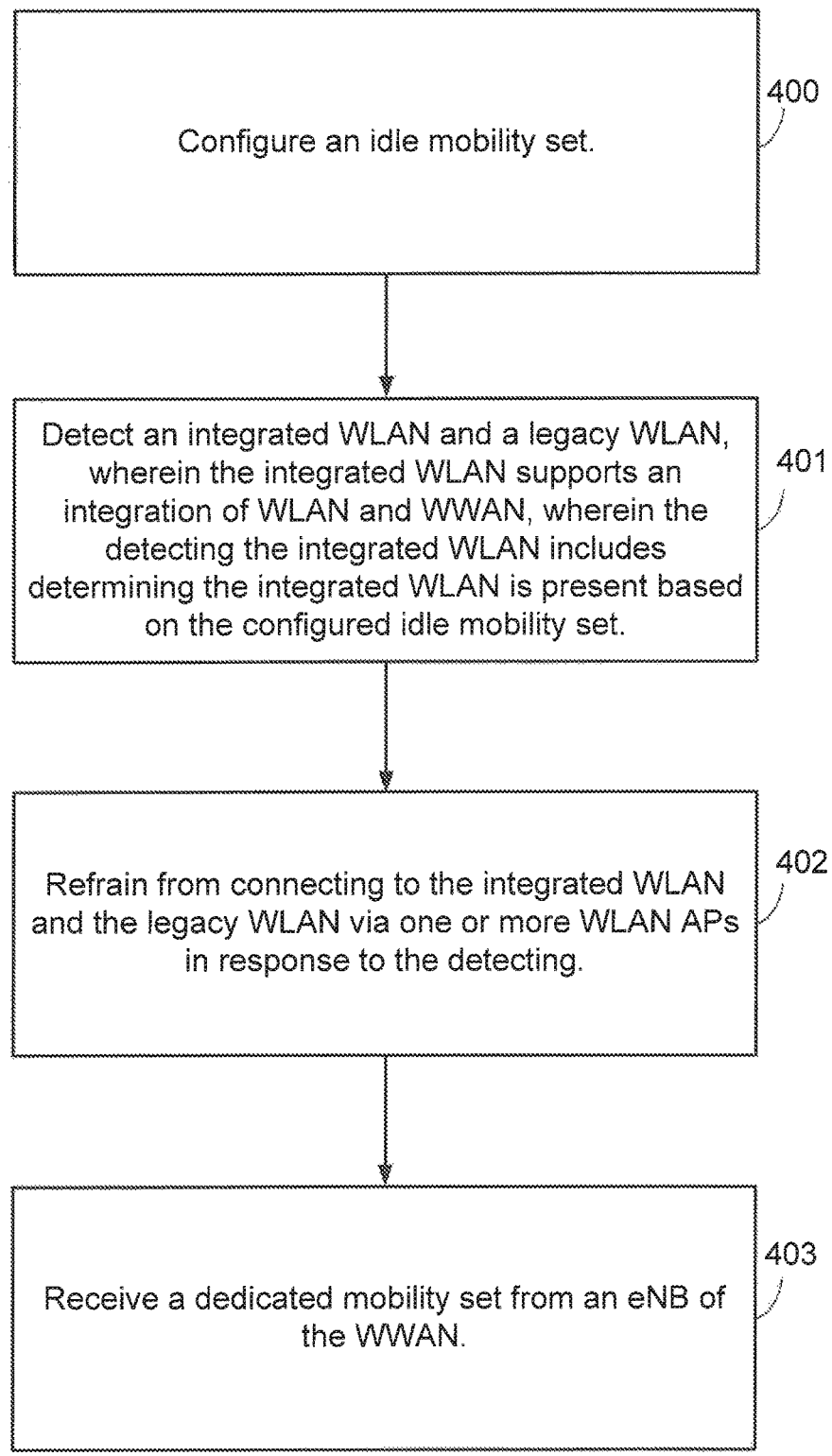
FIG. 4 is a block diagram illustrating example blocks executed to implement one aspect of the present disclosure.

FIG. 4 is a block diagram illustrating example blocks executed to implement methods based on the location configuration according to one aspect of the present disclosure. The example blocks will also be described with respect to UE 115 as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1500a-t and antennas 252a-r. Wireless radios 1500a-t includes various components and hardware, as illustrated in FIG. 2 for UE 115, including modulator/demodulators 254a-r, MIMO detector 256, receive processor 258, transmit processor 264, and TX MIMO processor 266.

At block 400, an idle mobility set may be configured at a user equipment (UE). The idle mobility set may be configured according to local configuration information. At block 401, an integrated wireless local access network (WLAN) and a legacy WLAN may be detected at the UE. The integrated WLAN may support an integration of WLAN and wireless wide access network (WWAN). The legacy WLAN may not support the integration of WLAN and WWAN. The detection of the integrated WLAN may be based on the configured idle mobility set. For example, the UE may check the configured idle mobility to determine whether the integrated WLAN is present and available to connect. The detection of the legacy WLAN may be based on the configured legacy WLAN identifiers. At block 402, the UE may refrain from connecting to the integrated WLAN and the legacy WLAN via one or more WLAN access points (APs) in response to the detection of both the integrated WLAN and the legacy WLAN. At block 403, a dedicated mobility set may be received from an evolved node B (eNB) of the WWAN. For example, the dedicated mobility set may be received from an eNB associated with LTE network. The UE may have entered into a radio resource control (RRC)-connected mode before receiving the dedicated mobility set. With the presence of idle mobility set, the UE may refrain from connecting to WLANs. In contrast, with the presence of dedicated mobility set, the UE may be allowed or demanded to connect to WLANs. After receiving the dedicated mobility set, the UE may connect to the integrated WLAN accordingly.

While the above procedures as illustrated in FIG. 4 may allow an eNB to have enough time to configure a dedicated mobility set by preventing a UE from connecting a legacy WLAN first, such procedures may not always be perfect. For example, a UE may refrain from connecting both an integrated WLAN and a legacy WLAN while an eNB associated with the integrated WLAN that is determined to be present based on configured idle mobility set is actually not able to support the integrated WLAN or configure any dedicated mobility set. This uncertainty may put the UE in a disadvantageous position, in terms of connectivity, than other UEs that have connected to the legacy WLAN in the same area.

Accordingly, in some aspects of the present disclosure, the configured idle mobility set may further restrict the areas where the above procedures apply. Accordingly, the configured idle mobility set may include identification information for such restricted area, such as a public land mobile network (PLMN) identification, a tracking area identification, a cell identification, or a cell type. Alternatively, a configuration policy that is received by the UE over-the-air or with the other network policies or configurations may also include identification information for the areas where the above procedures apply. However, the identification information may not always be precise. For example, a macro cell and a pico cell may share the same PLMN and tracking area identifiers. However, only the pico cell is capable of configuring a dedicated mobility set and support an integrated WLAN.

In order to make sure that the eNB associated with an integrated WLAN that is determined to be present based on configured idle mobility set is actually capable of configuring a dedicated mobility set, a flag from the eNB may be provided to a UE to verify such capability. For example, in some aspects of the present disclosure, a flag may be included in system information block (SIB) and be broadcast on a broadcast control channel (BCCH). In response, the UE may refrain from connecting to the integrated WLAN and legacy WLAN based on the received flag. The flag may include various pre-defined codewords, or specific elements detected on a broadcast channel. For instance, the flag may be a reserved PLMN in SIB 1, a special access class barring parameters in SIB 2, a well-known cell id in a black list of cells in SIB 4, an incomplete cell reselection parameter in SIB 8, a reselection time in SIB 8, etc.

Figure 5:
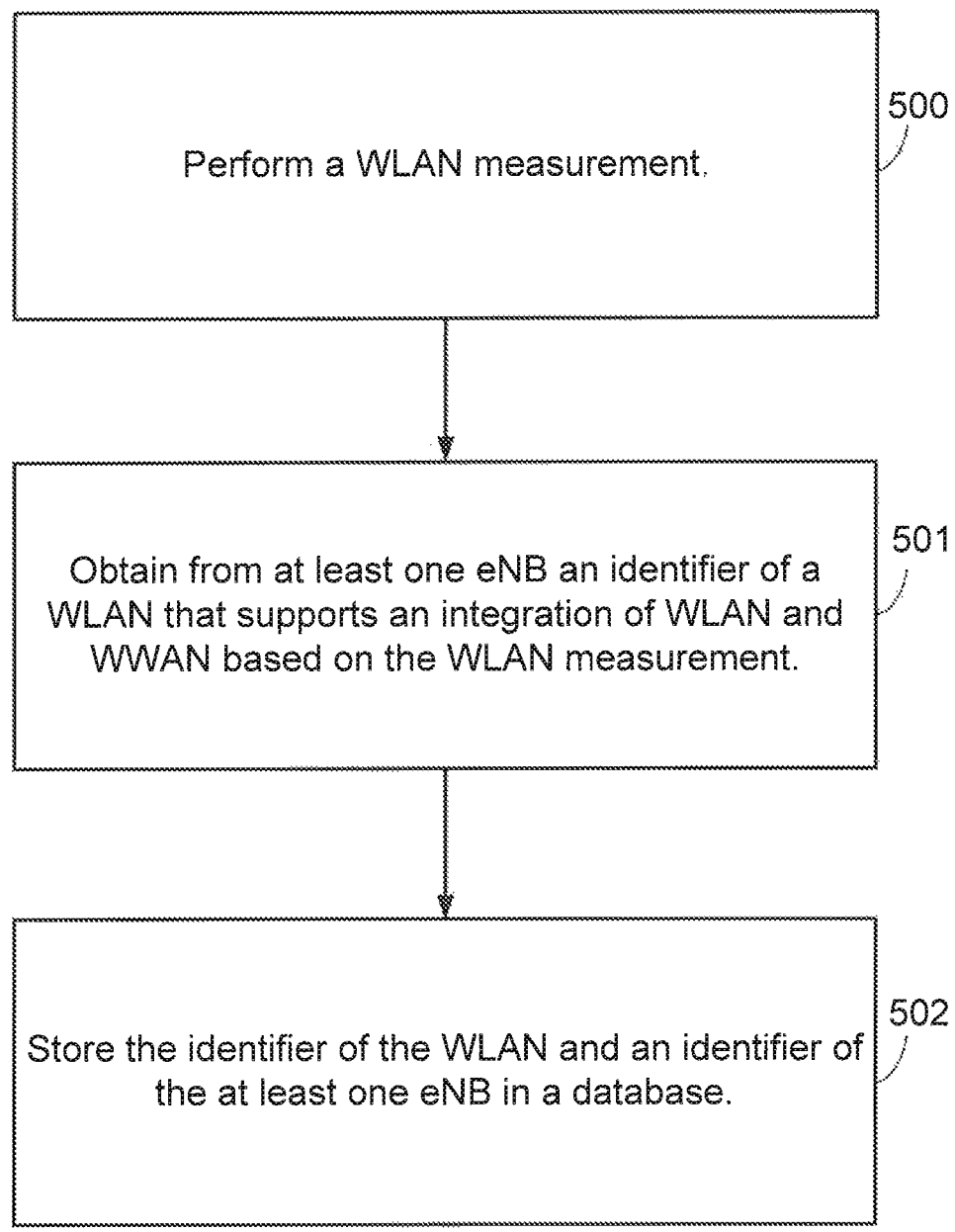
FIG. 5 is a block diagram illustrating example blocks executed to implement one aspect of the present disclosure.

In some aspects of the present disclosure, a UE may establish a database relating to histories of connections with integrated WLANs and eNBs capable of configuring a mobility set. The database may include information regarding dedicated mobility sets, identifiers of integrated WLANs, identifiers of eNBs associated with integrated WLANs, or relevant connection information. FIG. 5 is a block diagram illustrating example blocks executed to implement methods based on UE autonomous learning according to one aspect of the present disclosure. At block 500, a wireless local access network (WLAN) measurement may be performed by a UE. The WLAN measurement may be performed in accordance with a measurement request or a measurement configuration received from an eNB of a WWAN, such as LTE network, which supports an integrated WLAN. The WLAN measurement results may be reported back to the eNB for the eNB to configure a dedicated mobility set in the future. At block 501, an identifier of a WLAN that supports an integration of WLAN and wireless wide access network (WWAN) may be obtained by the UE from an eNB. The WLAN identifier may be part of the results of WLAN measurement. The UE may have entered into a RRC-connected mode before receiving the WLAN identifier. The identifier of the WLAN may include a service set identifier (SSID), a basic service set identifier (BSSID), or a homogenous extended service set identifier (HESSID). At block 502, the identifier of the WLAN and an identifier of the eNB may be stored in a database. The identifier of the eNB may include a cell identifier, a global unique cell identifier, etc. Additionally, a mobility set associated with the WLAN that supports an integration of WLAN and WWAN may also be received from the eNB, and stored in the database. However, such mobility set may be received when a competing legacy WLAN is unavailable to the UE. The legacy WLAN may refer to a WLAN that does not support an integration of WLAN and WWAN. The database may be located at the UE, or remotely located at another network entity that is in connection with the UE.

Accordingly, the UE may determine whether to refrain from connecting to the integrated WLAN and legacy WLAN based on the established database. For example, when the UE camps on a new eNB, the UE may check whether the new eNB is associated with any WLAN or eNB identified in the database. If yes, the UE may refrain from connecting to any WLAN, including the integrated WLAN and the legacy WLAN as such new eNB is possible to be capable of configuring a dedicated mobility set. If not, it is possible that such new eNB is not capable of configuring a dedicated mobile set. Hence, the UE may be allowed to connect to the legacy WLAN.

However, the connection histories in the database may not be useful when the UE changes its location. Therefore, in some aspects of the present disclosure, the identifiers of WLANs, identifiers of eNBs, and mobility sets identified in the database may be updated in response to a change of location of the UE.

Figure 6:
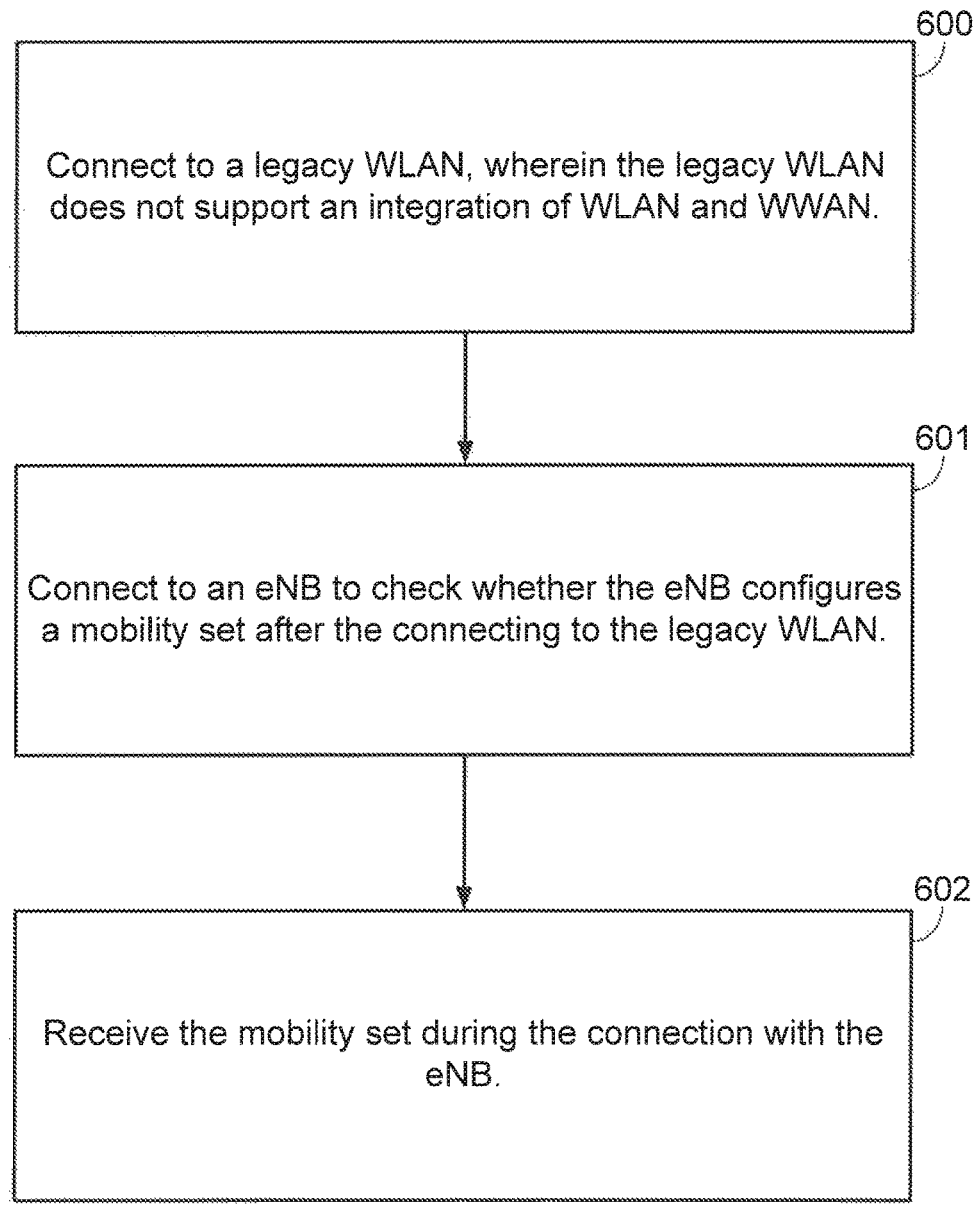
FIG. 6 is a block diagram illustrating example blocks executed to implement one aspect of the present disclosure.

In the situation that the UE has already been in connection with the legacy WLAN, an additional UE autonomous learning approach may be applied. FIG. 6 is a block diagram illustrating example blocks executed to implement methods based on UE autonomous learning according to one aspect of the present disclosure. At block 600, a legacy WLAN may be connected by a UE. The legacy WLAN may refer to a WLAN that does not support an integration of WLAN and wireless access network (WWAN). At block 601, UE may connect to an eNB to check whether such eNB configures or is capable of configuring a mobility set while being in connection with the legacy WLAN. For example, the UE may occasionally bring up LTE radio connections to check eNB's capability. For another example, the UE may bring up LTE radio connections to check eNB's capability in every certain period of time. At block 602, the mobility set may be received by the UE during the connection with the eNB. As discussed above, such mobility set and associated eNB may be identified and stored in a database for future use.

In some aspects of the present disclosure, the UE may connect to the eNB right after connecting to the legacy WLAN, or in the middle of the connection with the legacy WLAN. For example, the UE may delay routing data transmissions to the legacy WLAN after connecting to the legacy WLAN in order to allow the eNB to have sufficient time to configure a dedicated mobility set. As a further example, during the connection with the legacy WLAN, there may not be enough data traffic to trigger the eNB to configure a dedicated mobility set. As a result, the UE may not be able to obtain the dedicated mobility set from the eNB even if the UE has connected to the eNB. To resolve this issue, the UE may routing data transmissions to the eNB in order to trigger the eNB to configure the dedicated mobility set.

The UE autonomous learning approaches may have certain limitations. For example, a UE may connect to a legacy WLAN before connecting to an eNB that supports an integrated WLAN and configures a mobility set. As a further example, a UE may unnecessarily route data traffic to an eNB that does not support an integrated WLAN and does not configure a mobility set. These limitations may be mitigated by information regarding mobility set provided from the networks.

Figure 7:
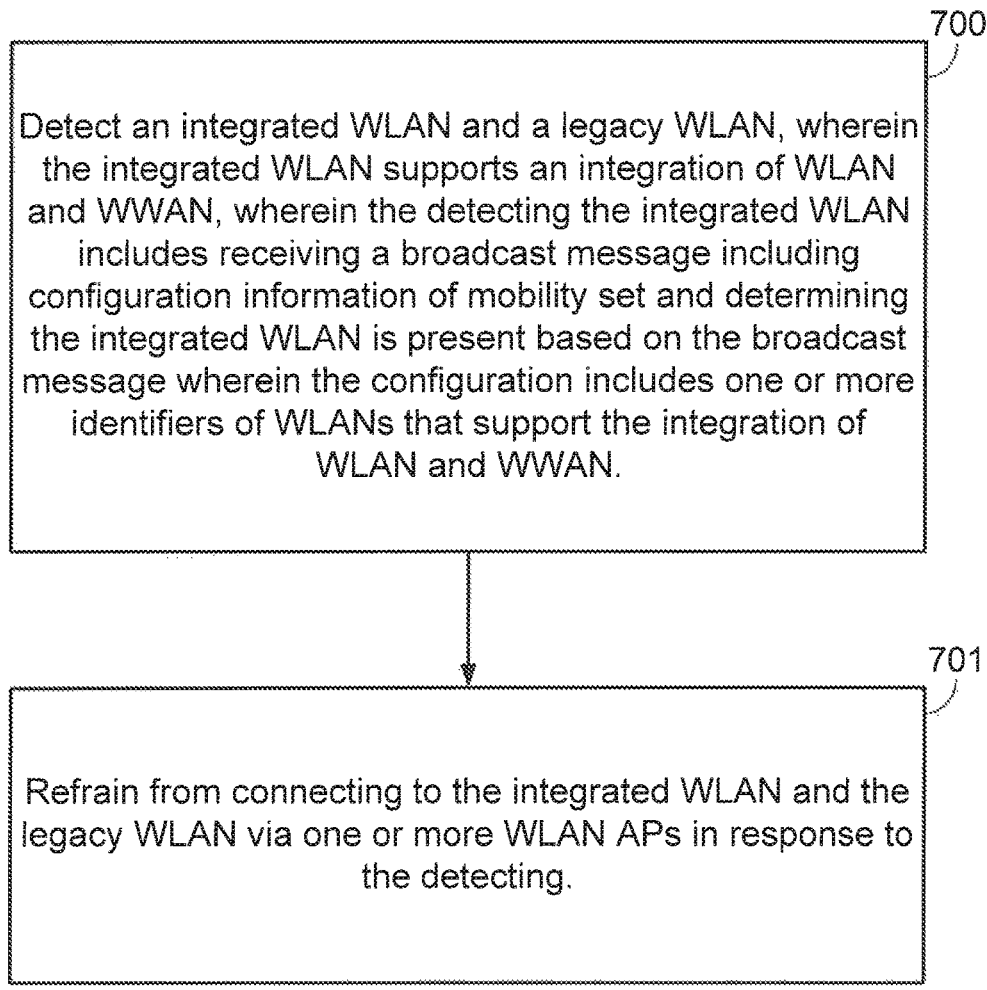
FIG. 7 is a block diagram illustrating example blocks executed to implement one aspect of the present disclosure.

FIG. 7 is a block diagram illustrating example blocks executed to implement methods based on broadcast of configuration information of mobility set according to one aspect of the present disclosure. At block 700, an integrated wireless local access network (WLAN) and a legacy WLAN may be detected at a user equipment (UE). The integrated WLAN may support an integration of WLAN and wireless wide access network (WWAN). A broadcast message may be received by the UE from the networks. For example, the broadcast message may be received from LTE network via an eNB. The detection of the legacy WLAN may include determining the integrated WLAN is present based on the received broadcast message. At block 701, the UE may refrain from connecting to the integrated WLAN and the legacy WLAN via one or more WLAN access points (APs) in response to the detection of WLAN and WWAN. Since the UE refrains from connecting to the integrated WLAN and the legacy WLAN, the eNB may have sufficient time to configure a dedicated mobility set and transmit such dedicated mobility set to the UE. Accordingly, the UE may connect to the integrated WLAN based on the received dedicated mobility set.

The broadcast message may include SIB or other information provided in a broadcast channel. The broadcast message may include configuration information of mobility set. The configuration information may act as a flag or an idle mobility set, as discussed above, to indicate that the eNB broadcasting configuration information of mobility set is capable of configuring a dedicated mobility set. In addition the broadcast message may include identifiers associated with the legacy WLAN available under the coverage of the eNB. Therefore, the UE shall refrain from connecting to the integrated WLAN and legacy WLAN in order to give the eNB sufficient time to configure the dedicated mobility set and transmit the dedicated mobility set to the UE. However, the configuration information of mobility set may further include one or more identifiers of integrated WLANs identified by the eNB. Such configuration information of mobility set may be used to configure a dedicated mobility set later by the eNB.

In 3GPP standards, such as 3GPP Release 12, SIB 17 provides information relating to thresholds for steering traffic to or from a WLAN, and relevant WLAN and LTE identifiers, such as WLAN SSIDs, or LTE PLMNs. SIB 17 may include configuration information of mobility set. Such configuration information of mobility set may include information of WLAN offload configuration and information of WLAN identifiers. For a standard-compliant UE, such as a 3GPP Release 12-compliant UE, the size of configuration information of mobility set may be equal to or less than the total number of PLMNs as provided in SIB 1. Normally, the maximum number of PLMNs served by an eNB is six (6). Correspondingly, the maximum number of PLMNs as provided in SIB 1 is also six (6). Also for the 3GPP Release 12-compliant UE, the list of WLAN identifiers may be consistent with the list of PLMN identifiers in SIB 1.

In some aspects of the present disclosure, configuration information of mobility set may be added into SIB 17 in the form of one or more additional entries of configuration information of mobility set. Such entries may include a list that is not consistent with the list of PLMN identifier in SIB 1. Therefore, the presence of such one or more additional entries may indicate that the eNB broadcasting such SIB 17 supports an integration of WLAN and WWAN and is capable of configuring a dedicated mobility set. The additional entry of configuration information of mobility set may also include both the information of WLAN offload configuration and information of WLAN identifiers. The information of WLAN identifiers may provide information regarding an idle mobility set that is broadcast to a UE and other network entities (in contrast to a dedicated mobility set that is transmitted to the UE using dedicating signals). The idle mobility set may include one or more identifiers of WLANs that support an integration of WLAN and WWAN. In some aspects of the present disclosure, legacy WLAN identifiers may also be added into SIB 17 in the form of an additional entry of list.

In order to make sure that such additional entry of configuration information of mobility set is not inadvertently added into SIB 17, a second layer of validation may be utilized. The second layer of validation can be performed by adding inverted hysteresis configuration into information of WLAN offload configuration of the additional entry of configuration information of mobility set. Such inverted hysteresis configuration may include unlikely or unreasonable values for UE operations. Accordingly, the presence of inverted hysteresis configuration in the information of WLAN offload configuration may serve as validation information to validate that the additional entry of configuration information of mobility set is not inadvertently added into SIB 17, and is indeed associated with configuration of mobility set. Also, since the inverted hysteresis configuration includes unlikely or unreasonable values for UE operations, the UE may not be triggered to operate accordingly. In other words, the UE may still be in compliance with the standards. The same concept of entry of configuration information of mobility set may be applicable to other 3GPP Release documents. The same concept of entry of configuration information mobility set may also be applicable to other SIBs.

Inverted hysteresis configuration may include a pair of reference signal received power (RSRP) threshold values, a pair of reference signal received quality (RSRQ) threshold values, a pair of channel utilization threshold values, a pair of backhaul bandwidth threshold values, or a pair of beacon received signal strength indicator (RSSI) threshold values. Operating in accordance with inverted hysteresis configuration would lead to a ping-pong effect between a WLAN and a WWAN. For example, the threshold on WWAN RSRP to enter WLAN should normally be higher than the threshold to leave WLAN. However, the threshold on WWAN RSRP to enter WLAN (e.g., 0) may be lower than the threshold to leave WLAN (e.g., 97) under inverted hysteresis configuration. As a result, assuming the higher power the higher value, the condition to leave a WLAN (<97) may be met as soon as the condition to enter the WLAN (>0) is met. The pair of RSRQ threshold values, the pair of channel utilization threshold values, the pair of backhaul bandwidth threshold values, and the pair of RSSI threshold values may be also provided in inverted hysteresis configuration.

In other aspects of the present disclosure, the second layer of validation can be performed by adding certain physically impossible value for WLAN radio communications into information of WLAN offload configuration of the additional entry of configuration information of mobility set. For example, the RSSI may be encoded with the mapping: "Value 0 corresponds to −128 dBm, 1 corresponds to −127 dBm and so on." This means that value 255 will correspond to 127 dBm. However, 127 dBm actually corresponds to a life threatening radiofrequency level.

In SIB 17, the offload preference indicator (OPI) in the ANDSF specification is a 16 bit bitmap. By selecting a unique bitmap, the probability that a random configuration matches may become very low: $1.5 \times 10^{-5}$. The ANDSF specification states the UE considers the ANDSF node as matching when the bitwise 'AND' operation between the OPI value received from RAN and the OPI value contained in the ANDSF node is non-zero. If this ANDSF node is provided, it may be very likely the bitwise AND is non-zero. In certain scenarios, optional Information Elements (IE) may be omitted to reduce the BCCH overheads.

At the UE side, the UE may interpret configuration information of mobility set in accordance with the following rules: (1) ignore the values in the information of WLAN offload configuration of the additional entry of configuration information of mobility set and (2) use the WLAN identifiers provided in the information of WLAN identifiers of the additional entry of configuration information of mobility set (the idle mobility set). The UE may use the received idle mobility set anytime while a dedicated mobility set is not configured by an eNB. In addition, when performing WLAN access authentication to an integrated WLAN, if a pairwise master key (PMK) for LWA WLAN association is present in the last RRC connection, the UE may assume it is still valid. However, if not, the UE may use a legacy extensible authentication protocol method (EAP-AKA) authentication.

In other aspects of the present disclosure, information element of mobility set may be directly added into SIB 17 and broadcast on a broadcast channel. For example, information element of mobility set, such as information element of mobility set under Release 13, may be added into SIB 17 and may become part of 3GPP Release 14. In response, the UE may refrain from connecting to either an integrated WLAN or a legacy WLAN with the presence of information element of mobility set. Information element of mobility set may include the information included in the configuration information of mobility set as discussed above. However, comparing to the configuration information of mobility set, the information element of mobility set may not need a second layer of validation. Both configuration information of mobility set and information element of mobility set may be used by an eNB to configure a dedicated mobility set later. The same concept of entry of information element of mobility set may be applicable to other 3GPP Release documents. The same concept of entry of information element of mobility set may also be applicable to other SIBs.

A UE may receive information element of mobility set in an idle mode and use the information element of mobility set in both the idle and RRC-connected modes until receiving a dedicated mobility set. In some aspects of the present disclosure, the UE may also receive information element of mobility set after connecting to an integrated WLAN according to a received dedicated mobility set. Such information element of mobility set may instruct that the UE terminate its current connection to the integrated WLAN.

Figure 8:
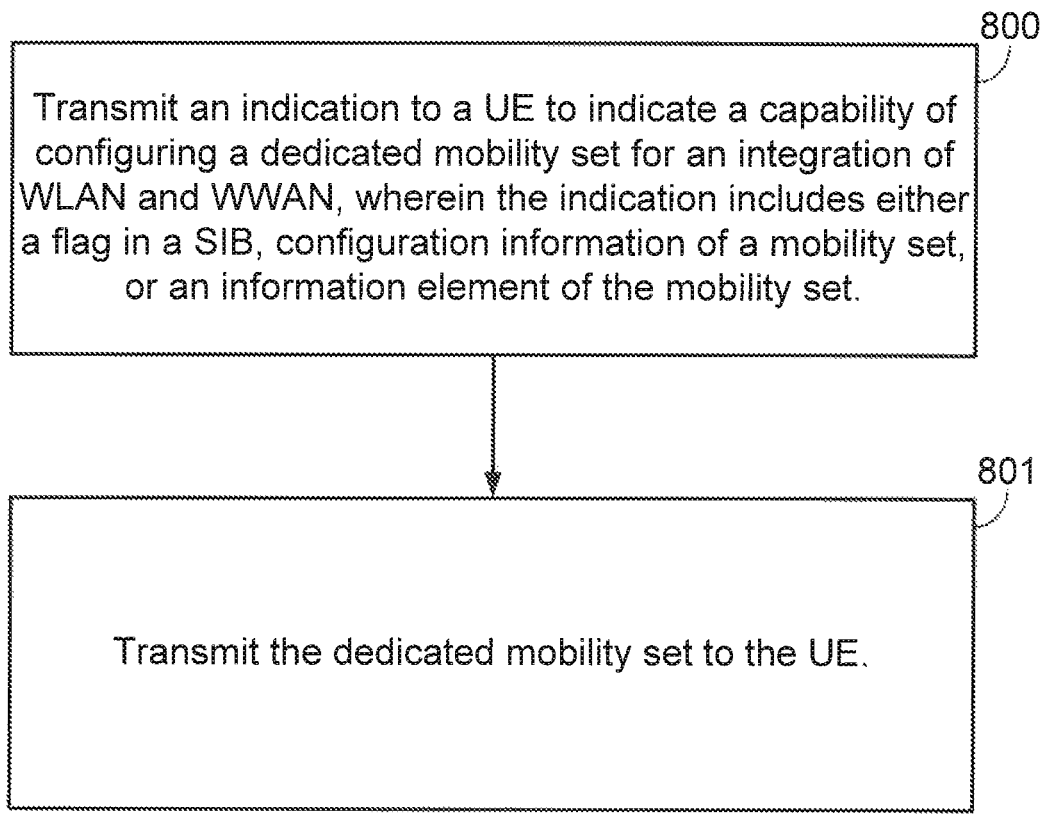
FIG. 8 is a block diagram illustrating example blocks executed to implement one aspect of the present disclosure.

A flag, configuration information of mobility set, and information element of mobility set may be added into a broadcast message, such as system information blocks. FIG. 8 is a block diagram illustrating example blocks executed to implement methods by an eNB according to one aspect of the present disclosure. At block 800, an indication to a user equipment (UE) may be transmitted to indicate a capability of configuring a dedicated mobility set for an integration of wireless local access network (WLAN) and wireless wide access network (WWAN). The indication may include a flag in a system information block (SIB), configuration information of mobility set, or information element of mobility set. At block 801, the dedicated mobility set may be transmitted to the UE. With cooperation of an eNB, a UE may better utilize radio resources provided by both the WLAN and WWAN.

Figure 9:
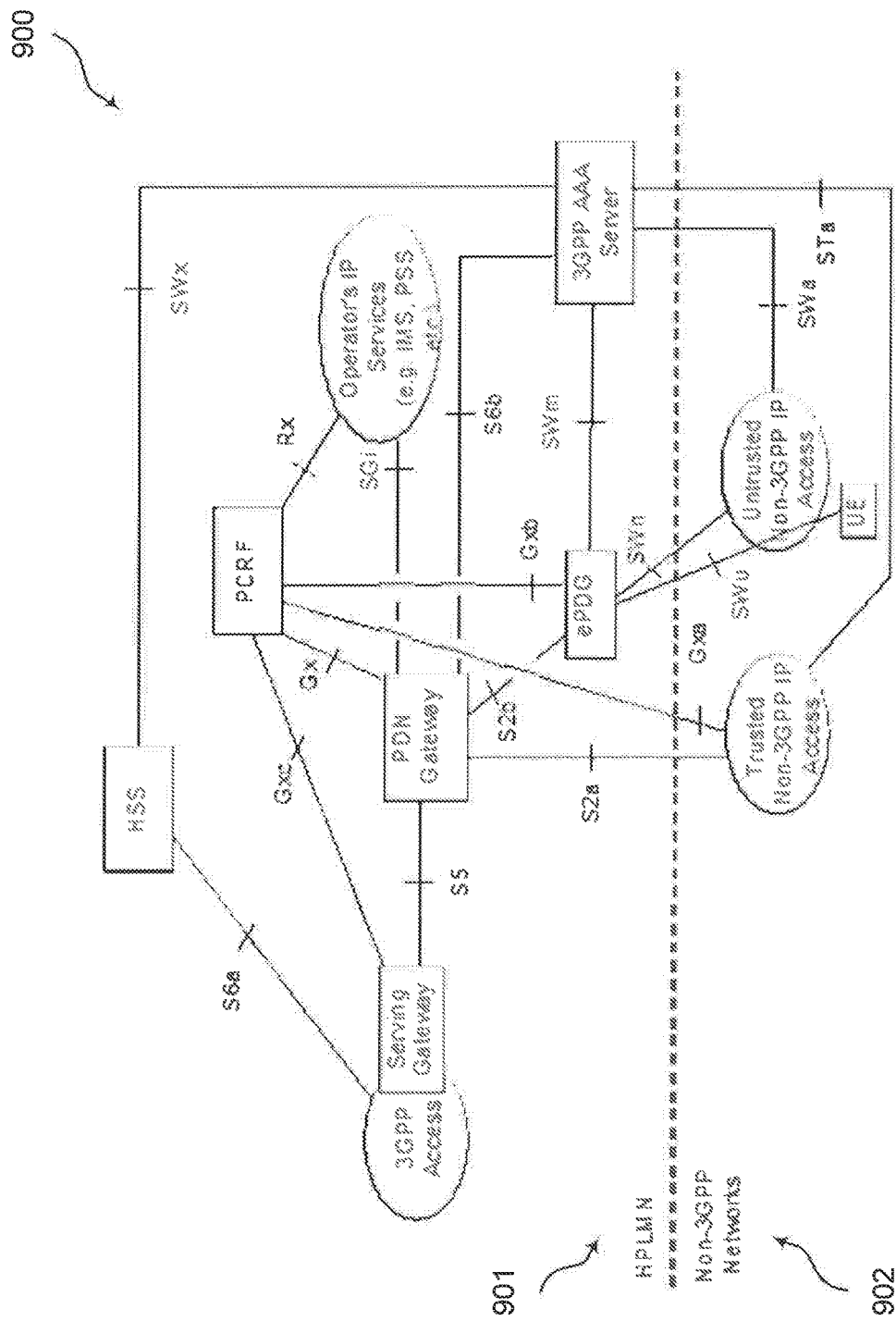
FIG. 9 is a block diagram illustrating a wireless network for communications, which includes a HPLMN and a WLAN (not controlled by 3GPP network), according to one aspect of the present disclosure

FIG. 9 is a block diagram illustrating a wireless network 900 for communications, which may include home public land mobile network (HPLMN) 901 and WLAN (not controlled by 3GPP network) 902, according to one aspect of the present disclosure. 3GPP standards provides two methods to allow a UE to access evolved packet core (EPC) over WLAN: S2a method and S2b method. S2a method may allow the UE to access EPC via a trusted WLAN. In a trusted access, the UE may be connected to EPC via a trusted wireless access gateway (TWAG) (not shown in FIG. 9). The TWAG may be connected with the Packet Data Network (PDN) gateway in EPC through a GPRS Tunneling Protocol (GTP) tunnel. S2a method may be also referred to as an S2a mobility over GTP gateway (SAMOG) method. In contrast, S2b method may allow the UE to access EPC via an untrusted WLAN. In an untrusted access, the UE may be connected to EPC via an evolved packet data gateway (ePDG). The ePDG may be connected with the PDN gateway in EPC through a secure IPSec tunnel. With these methods, the UE can move a PDN connection, such as an internet PDN connection, or an IP multimedia subsystem (IMS) PDN connection, from a WWAN access to a WLAN access. In some cases, once the PDN connection is moved, the UE may not use the WWAN access for the associated PDN connection.

The integrated WLAN, which enables LWA, LWIP, or RCLWI, may be as capable as the legacy WLAN regarding providing services, such as voice over IP (VoIP) services, or data services. For example, LWIP may also have differentiated services code point (DSCP) marks in an outer header to enable different levels of services to be assigned to network traffic and provide quality of service (QoS) on IP networks. The DSCP marks in the outer header may be copied from the DSCP in an inner header. LWIP may provide VoIP bearer (IMS access point name (APN)) and default bearer (internet APN) on a WWAN, such as a LTE network, while the actual data flows over the LWIP tunnel over the WLAN access. In addition, LWIP may provide control plane gain. Accordingly, an eNB may bring a UE back to a WWAN, such as a LTE network, in response to LWIP transport issues. In contrast, the legacy WLAN, which connects with EPC via ePDG, may perform selection between the legacy WLAN and a WWAN, such as a LTE network, based on static policies. The static policies may be configured at the UE, or broadcast from the networks. Legacy WLAN may enable ePDG access that may provide IMS APN and non-seamless WLAN offload (NSWO) (LTE internet APN is removed). Accordingly, there may be no motivation for a UE to use LWIP access (integrated WLAN) and ePDG access (legacy WLAN) at the same time. The integrated WLAN used for LWIP and/or LWA may not be available for ePDG access.

Figure 10:
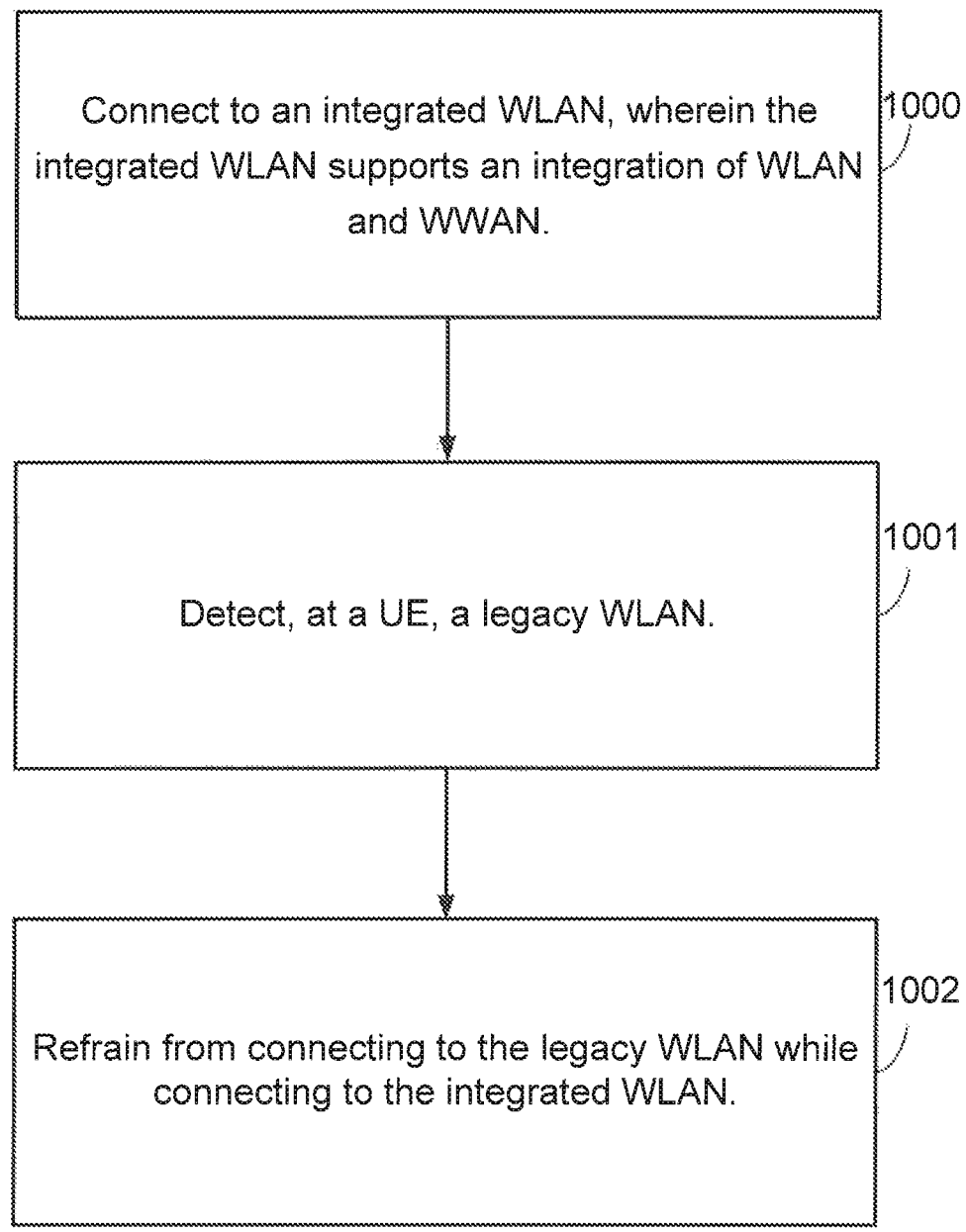
FIG. 10 is a block diagram illustrating example blocks executed to implement one aspect of the present disclosure.

FIG. 10 is a block diagram illustrating example blocks executed to implement methods in accordance with one aspect of the present disclosure. The example blocks will also be described with respect to UE 115 as illustrated in FIG. 2. At block 1000, an integrated WLAN may be connected by a UE. The integrated WLAN may support an integration of WLAN and WWAN. Therefore, the integrated WLAN may support one or more of: LWA, LWIP, or RCLWI. The UE may be in a radio resource control (RRC)-connected mode while being connected with the integrated WLAN. At block 1001, a legacy WLAN may be detected by the UE. The legacy WLAN may be detected by the UE based on information of identity of the legacy WLAN. Such information may be configured at the UE, or obtained from a broadcast message received at the UE. The UE may be able to access EPC via the legacy WLAN, which may be a trusted WLAN, or an untrusted WLAN. At block 1002, the UE may refrain from connecting to the legacy WLAN while connecting to the integrated WLAN.

The methods as provided in FIGS. 4 and 7 may be also effective as to refraining the UE from connecting to the legacy WLAN and setting up ePDG to offload to WLAN because these methods prevent the UE from connecting to the legacy WLAN, and so prevent the ePDG setup.

Figure 11:
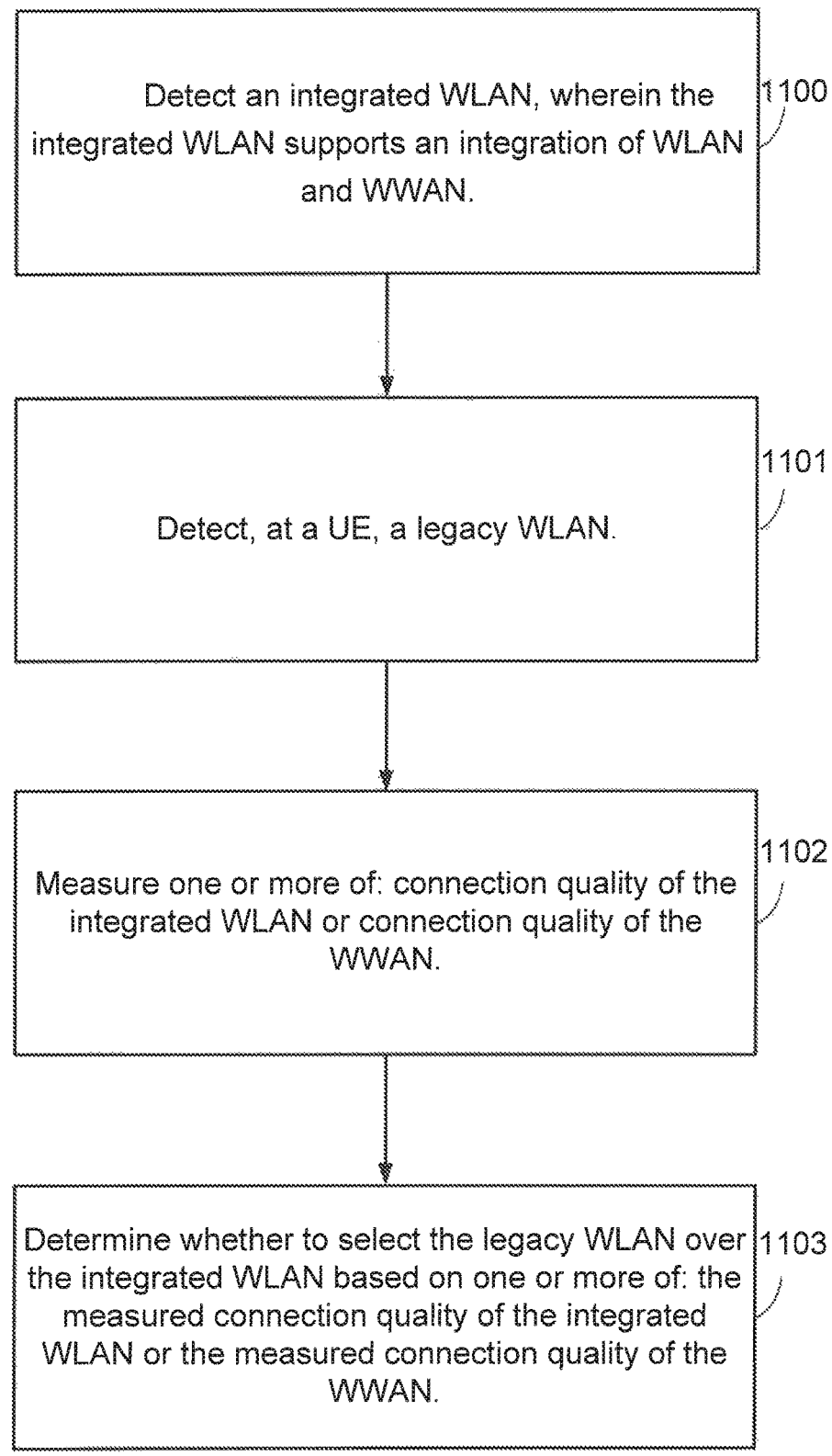
FIG. 11 is a block diagram illustrating example blocks executed to implement one aspect of the present disclosure.

FIG. 11 is a block diagram illustrating example blocks executed to implement methods in accordance with one aspect of the present disclosure. A UE may sometimes prioritize a legacy WLAN over an integrated WLAN in response to coverage degradation of the integrated WLAN or the WWAN associated with the integrated WLAN. When the quality of the coverage of the integrated WLAN or the quality of the coverage of the WWAN is below certain level, it may be too risky to select the integrated WLAN over an available legacy WLAN. For example, it may be too risky to let the LTE RRC to manage the LWIP, as the RRC requires effective LTE communication, which has poor coverage. In such case, the UE may not refrain from connecting to the legacy WLAN while detecting or connecting to the integrated WLAN, but may select the legacy WLAN over the integrated WLAN.

The example blocks will be described with respect to UE 115 as illustrated in FIG. 2. At block 1100, an integrated WLAN may be detected at a UE. The integrated WLAN may support an integrated of WLAN and WWAN. Therefore, the integrated WLAN may support one or more of: LWA, LWIP, or RCLWI. At block 1101, a legacy WLAN may be detected at the UE. The legacy WLAN may be detected at the UE based on information of identity of the legacy WLAN. Such information may be configured at the UE, or obtained from a broadcast message received at the UE from a base station. The UE may access EPC via the legacy WLAN, which may be a trusted WLAN, or an untrusted WLAN. At block 1102, connection quality of the integrated WLAN and/or connection quality of the WWAN may be measured. The UE may measure one or more of signal-to-noise ratio (SNR) of the received pilot signals, or network loads of the integrated WLAN or the WWAN associated with the integrated WLAN. The WWAN associated with the integrated WLAN may control the connection of the integrated WLAN. Alternatively, the measurement may be performed by other networks entities, and then provided to the UE. At block 1103, whether to select the legacy WLAN over the integrated WLAN may be determined based on one or more of: the measured connection quality of the integrated WLAN or the measured connection quality of the WWAN.

In some aspects of the present disclosure, the connection quality of the WWAN that is associated with the integrated WLAN may be measured when the UE is in an RRC-connected mode, or an RRC-idle mode.

A threshold regarding the connection quality may be predetermined. The predetermined threshold may be determined with respect to received signal strength, or network loads. If the measured connection quality of the integrated WLAN or the measured connection quality of the WWAN is below the predetermined threshold, the UE may determine to select the legacy WLAN over the integrated WLAN under the control of the WWAN, and connect to the legacy WLAN. In such case, the UE will not connect to the integrated WLAN. Accordingly, LWA, LWIP, or RCLWI will not be enabled. If the measured connection quality of the integrated WLAN or measured connection quality of the WWAN is above the predetermined threshold, the UE may determine to select the integrated WLAN under the control of WWAN, such as control of the LTE network, over the legacy WLAN, and inhibit connection to the legacy WLAN. As a result, the UE may end up connecting to the integrated WLAN with the help by WWAN signaling. In such case, the UE may refrain from connecting to the legacy WLAN until determining to select the legacy WLAN over the integrated WLAN in response to degradation of measured connection quality of the integrated WLAN or degradation of measured connection quality of the WWAN.

In some aspects of the present disclosure, the UE may determine to select the legacy WLAN over the integrated WLAN in accordance with a WLAN or ePDG policy, or a decision made by an IMS handover (HO) engine. The WLAN policy may specify certain conditions of selecting the legacy WLAN over the integrated WLAN. Once such conditions are met, the UE may select the legacy WLAN over the integrated WLAN. For example, the WLAN policy may be a voice over WLAN (VoWLAN) policy. The VoWLAN may be a LTE preferred policy, or a WLAN preferred policy. The LTE preferred policy, compared with the WLAN preferred policy, may provide more difficult conditions of selecting the legacy WLAN over the integrated WLAN. Accordingly, with the LTE preferred policy, the UE may determine to select the legacy WLAN over the integrated WLAN when the connection quality of the integrated WLAN or connection quality of the associated WWAN has been degraded to very low level. With the WLAN preferred policy, the UE may determine to select the legacy WLAN over the integrated WLAN even when the connection quality of the integrated WLAN or connection quality of the associated WWAN is relatively good. The conditions in WLAN policies may be predetermined SNRs of pilot signals, or predetermined network loads, such as integrated WLAN loads, or WWAN loads. The WLAN policies may be configured at the UE, or received from the networks.

In some aspects of the present disclosure, the UE may handover to the legacy WLAN from the integrated WLAN while the UE is in a radio resource control (RRC)-connected mode with the integrated WLAN. The UE may perform the handover in accordance with the WLAN policy, or a decision made by an IMS handover (HO) engine, or when the measured connection quality of the integrated WLAN is below a predetermined threshold. The predetermined threshold for handover from the integrated WLAN to the legacy WLAN (after the UE connecting to the integrated WLAN) may be the same as or different from the predetermined threshold for determining to select the legacy WLAN over the integrated WLAN (before the UE connecting to the integrated WLAN).

A UE may refrain from connecting to a legacy WLAN when an integrated WLAN is available as discussed above. In addition, the UE may also refrain from connecting to the legacy WLAN when a WWAN using both licensed and unlicensed spectrum is available, such as a license assisted access (LAA) LTE network, as both the legacy WLAN and the LAA LTE network use unlicensed spectrum and may compete with each other. The unlicensed spectrum may include 2.4 GHz frequency band, or 5 GHz frequency band. The LAA LTE network may allow a primary component carrier using licensed spectrum, and a secondary component carrier using unlicensed spectrum.

Figure 12:
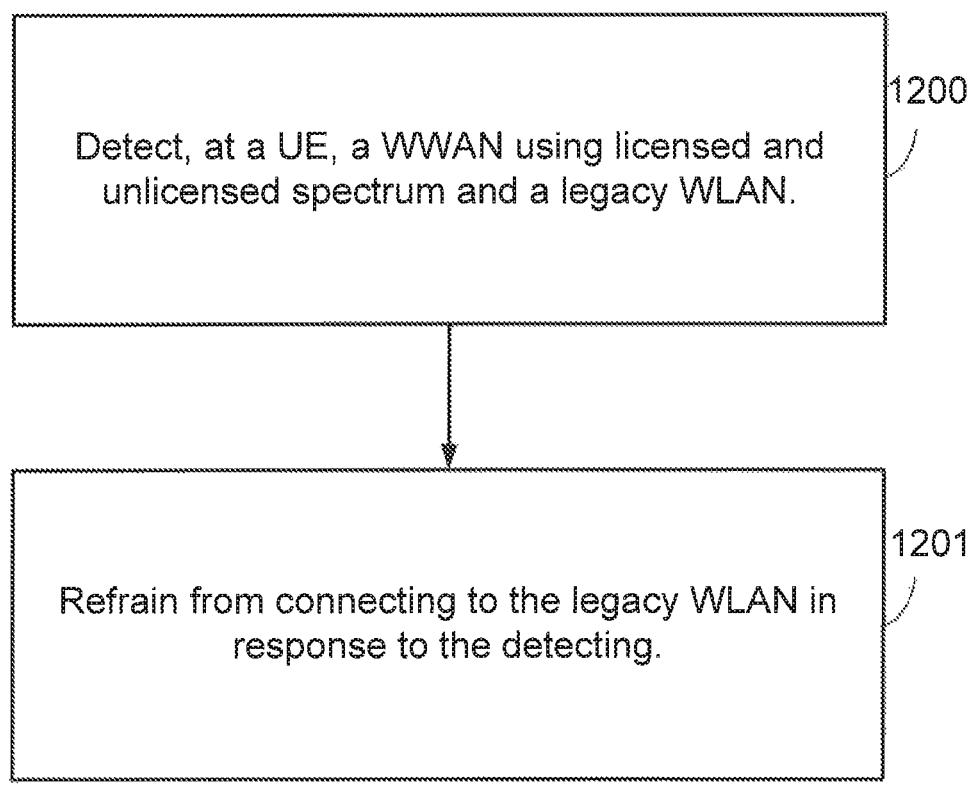
FIG. 12 is a block diagram illustrating example blocks executed to implement one aspect of the present disclosure.

FIG. 12 is a block diagram illustrating example blocks executed to implement methods in accordance with one aspect of the present disclosure. The example blocks will also be described with respect to UE 115 as illustrated in FIG. 2. At block 1200, a WWAN using licensed and unlicensed spectrum and a legacy WLAN may be detected at a UE. The use of the unlicensed spectrum by the WWAN may be indicated in a broadcast message from a base station associated with the WWAN. In some aspects of the present disclosure, the WWAN using licensed and unlicensed spectrum may be a LAA LTE network. The LAA LTE network and the legacy WLAN may utilize different waveforms in the 5 GHz unlicensed spectrum. In such case, an eNB that is capable of providing LAA (LAA eNB) may configure LAA LTE network for the UE. The eNB may send a broadcast message indicating that the unlicensed spectrum is utilized by LAA LTE network. At block 1201, the UE may refrain from connecting to the legacy WLAN. Then, the UE may connect to the WWAN that allows the WWAN to configure component carriers in the unlicensed spectrum.

In some aspects of the present disclosure, the UE may determine that the WWAN using licensed and unlicensed spectrum is present based on the broadcast message or a database. Such database may be in the UE, or another network entity in connection with the UE. Such determination may be part of procedures of detecting the WWAN using licensed and unlicensed spectrum. The database may be stored with at least one identifier of at least one eNB that has configured the UE to use the unlicensed spectrum before when a legacy WLAN is not present or unavailable.

In some aspects of the present disclosure, the UE may be preconfigured with configuration information that includes at least one identifier of at least one legacy WLAN that is prohibited from being connected. The UE may refrain from connecting to the legacy WLANs identified in configuration information.

In some aspects of the present disclosure, the UE may stop refraining from connecting to the legacy WLAN based on determining the connection quality of the integrated WLAN or the connection quality of the associated WWAN is below certain level. The connection quality may be radio quality. As a result, the UE may instead connect to the legacy WLAN. Once the UE is connected with the legacy WLAN, the UE will not connect to the WWAN using licensed and unlicensed spectrum.

In other aspects of the present disclosure, an integrated WLAN, in addition to the legacy WLAN and the WWAN using licensed and unlicensed spectrum, may be also detected by the UE. The integrated WLAN may support an integration of WLAN and WWAN. The UE may detect a conflict of using unlicensed spectrum by both the integration of WLAN and the WWAN using licensed and unlicensed spectrum, such as a LAA LTE network. In response to the conflict, the UE may determine either to connect to the integrated WLAN or the WWAN using licensed and unlicensed spectrum. In such case, an eNB may have configured both the integrated WLAN or the WWAN using licensed and unlicensed spectrum for the UE. The UE may make such determination based on the throughputs, bandwidths, SNRs of pilot signals, or network loads of the integrated WLAN and the WWAN using licensed and unlicensed spectrum. For example, the UE may prioritize the integrated WLAN over the LAA LTE network when the integrated WLAN utilizes a channel with 80 MHz bandwidth and the LAA LTE network utilize a channel with 20 MHz bandwidth.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4-8 and 10-12 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
configuring, at a user equipment (UE), an idle mobility set, including receiving, in a broadcast message, a configuration of the mobility set that includes one or more identifiers of wireless local access networks (WLANs) that support the integration of WLAN and wireless wide access network (WWAN) and information of WLAN offload configuration that includes an inverted hysteresis configuration that includes unreasonable values for UE operations;
validating, by the UE and in response to detecting presence of the inverted hysteresis configuration that includes the unreasonable values for the UE operations in the information of WLAN offload configuration, that the configuration of the mobility set in the broadcast message is associated with configuration of the mobility set;
detecting, at the UE, an integrated WLAN and a legacy WLAN, wherein the integrated WLAN supports the integration of WLAN and WWAN, wherein the detecting the integrated WLAN includes determining the integrated WLAN is present based on the configured idle mobility set;
refraining from connecting to the integrated WLAN and the legacy WLAN via one or more WLAN access points (APs) in response to the detecting; and
receiving a dedicated mobility set from a base station of the WWAN.

2. The method of claim 1, further comprising connecting to the integrated WLAN based on the received dedicated mobility set.

3. The method of claim 1, wherein the detecting the integrated WLAN includes determining the integrated WLAN is present in a restricted area, wherein the restricted area is determined based at least in part on the configured idle mobility set or a configuration policy.

4. The method of claim 3, wherein the configured idle mobility set or the configuration policy includes one or more of: a public land mobile network (PLMN) identification, a tracking area identification, a cell identification, or a cell type.

5. The method of claim 1, wherein the one or more WLAN APs include a WLAN AP of the integrated WLAN and a WLAN AP of the legacy WLAN.

6. The method of claim 1, wherein the one or more WLAN APs include a WLAN AP providing services associated with both the integrated WLAN and the legacy WLAN.

7. The method of claim 1, further comprising utilizing the idle mobility set until receiving the dedicated mobility set.

8. The method of claim 1, wherein the receiving the dedicated mobility set includes receiving the dedicated mobility set when the UE is in radio resource control (RRC)-connected mode.

9. The method of claim 1, wherein the detecting the integrated WLAN includes receiving a flag from the base station, wherein the flag indicates a capability of the base station to configure the dedicated mobility set.

10. A method of wireless communication, comprising:
broadcasting an indication to a user equipment (UE) to indicate a capability of configuring a dedicated mobility set for an integration of wireless local access network (WLAN) and wireless wide access network (WWAN), wherein the indication includes one or more identifiers of WLANs that support the integration of WLAN and wireless wide access network (WWAN), information of WLAN offload configuration that includes an inverted hysteresis configuration that includes unreasonable values for UE operations, and validation information to validate that configuration information of mobility set in a system information block (SIB) is associated with configuration of the mobility set; and transmitting the dedicated mobility set to the UE.

11. The method of claim 10, wherein the indication further includes a flag that includes one or more of: a reserved public land mobile network (PLMN) identification, a special access class barring parameter, a well-known cell identification in a black list of cells, an incomplete cell reselection parameter, or a reselection time.

12. The method of claim 10, wherein the validation information comprises the inverted hysteresis configuration in the information of WLAN offload configuration.

13. A method of wireless communication, comprising:
receiving, at a user equipment (UE) in a broadcast message, a set of one or more identifiers of wireless local access networks (WLANs) that support the integration of WLAN and wireless wide access network (WWAN), validation information to validate that configuration information of mobility set in a system information block (SIB) is associated with configuration of the mobility set, and information of WLAN offload configuration that includes an inverted hysteresis configuration that includes unreasonable values for UE operations;
configuring, by the UE, an idle mobility set based on the received set;
detecting, at the UE, an integrated WLAN, wherein the integrated WLAN supports the integration of WLAN and WWAN;
detecting, at the UE, a legacy WLAN;
measuring one or more of: connection quality of the integrated WLAN or connection quality of the WWAN; and
determining whether to select the legacy WLAN over the integrated WLAN based on one or more of: the measured connection quality of the integrated WLAN, or the measured connection quality of the WWAN.

14. The method of claim 13, wherein the determining includes determining to select the legacy WLAN when the measured connection quality of the integrated WLAN or the measured connection quality of the WWAN is below a predetermined threshold.

15. The method of claim 13, wherein the measuring includes measuring one or more of: signal-to-noise ratio (SNR) of pilot signals, or network loads of the integrated WLAN or the WWAN.

16. The method of claim 13, wherein the determining includes determining whether to select the legacy WLAN over the integrated WLAN in accordance with a WLAN policy, or an IP Multimedia Subsystem (IMS) handover engine.

17. The method of claim 13, wherein the integrated WLAN supports one or more of: long term evolution WLAN aggregation (LWA), long term evolution WLAN integration at IP Tunnel (LWIP), or radio access network controlled long term evolution WLAN integration (RCLWI).

18. The method of claim 13, wherein the legacy WLAN connects to an internet via one or more of: a trusted wireless access gateway (TWAG), or an evolved packet data gateway (ePDG).

19. The method of claim 13, further comprising connecting to the integrated WLAN.

20. The method of claim 19, further comprising refraining from connecting to the legacy WLAN while connecting to the integrated WLAN until determining to select the legacy WLAN over the integrated WLAN based on one or more of: the measured connection quality of the integrated WLAN or the measured connection quality of the WWAN.

21. The method of claim 13, wherein the measuring the connection quality of the WWAN includes measuring the connection quality of the WWAN when the UE is in a radio resource control (RRC)-idle mode.

22. The method of claim 13, wherein the detecting the legacy WLAN includes determining the legacy WLAN is present based on an identifier of the legacy WLAN, wherein the identifier of the legacy WLAN is in a broadcast message received from a base station.

23. A method of wireless communication, comprising:
detecting, at a user equipment (UE) based at least in part on information received in a broadcast message that includes one or more identifiers of wireless local access networks (WLANs) that support the integration of WLAN and wireless wide access network (WWAN), validation information to validate that configuration information of mobility set in a system information block (SIB) is associated with configuration of the mobility set, and information of WLAN offload configuration that includes an inverted hysteresis configuration that includes unreasonable values for UE operations, a WWAN using licensed and unlicensed spectrum and a legacy WLAN; and
refraining from connecting to the legacy WLAN in response to the detecting.

24. The method of claim 23, further comprising connecting to the WWAN using the licensed and unlicensed spectrum.

25. The method of claim 23, further comprising stopping the refraining and connecting to the legacy WLAN.

26. The method of claim 23, wherein the detecting the WWAN using licensed and unlicensed spectrum includes one or more of:
determining the WWAN using licensed and unlicensed spectrum is present based on a broadcast message indicating that the unlicensed spectrum is used by the WWAN; or
determining the WWAN using licensed and unlicensed spectrum is present based on a database, wherein the database is stored with at least one identifier of at least one base station that configured the UE to use the unlicensed spectrum before when the legacy WLAN was not available.

27. The method of claim 23, wherein the detecting the legacy WLAN includes determining an identifier of the legacy WLAN is present in configured information in the UE, wherein the configured information includes at least one identifier of at least one legacy WLAN that is prohibited from being connected by the UE.

28. The method of claim 23, further comprising detecting an integrated WLAN, wherein the integrated WLAN supports an integration of WLAN and WWAN.

29. The method of claim 28, further comprising detecting a conflict of using the unlicensed spectrum by the WWAN using licensed and unlicensed spectrum and by the integrated WLAN.

30. The method of claim 29, further comprising in response to the detecting the conflict, determining connecting to the integrated WLAN or the WWAN using the licensed and unlicensed spectrum based on one or more of:

their maximum throughputs, their bandwidths, signal-to-noise ratios (SNRs) of their pilot signals, or their network loads.

31. The method of claim 23, wherein the one or more identifiers of WLANs include at least one of a service set identifier (SSID), a basic service set identifier (BSSID), or a homogenous extended service set identifier (HESSID).

* * * * *